United States Patent
Zhu et al.

(10) Patent No.: US 11,068,707 B2
(45) Date of Patent: Jul. 20, 2021

(54) PERSON SEARCHING METHOD AND APPARATUS AND IMAGE PROCESSING DEVICE

(71) Applicant: FUJITSU LIMITED, Kawasaki (JP)

(72) Inventors: Xiantan Zhu, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 6 days.

(21) Appl. No.: 16/656,620

(22) Filed: Oct. 18, 2019

(65) Prior Publication Data

US 2020/0134306 A1 Apr. 30, 2020

(30) Foreign Application Priority Data

Oct. 30, 2018 (CN) .......................... 201811275884.6

(51) Int. Cl.
*G06K 9/00* (2006.01)
*G06K 9/46* (2006.01)
(Continued)

(52) U.S. Cl.
CPC ..... *G06K 9/00369* (2013.01); *G06K 9/00771* (2013.01); *G06K 9/46* (2013.01); *G06K 9/6215* (2013.01); *G06T 3/0018* (2013.01)

(58) Field of Classification Search
CPC .. G06K 9/00362; G06K 9/00288; G06K 9/46; G06K 9/6234; G06K 9/00369;
(Continued)

(56) References Cited

U.S. PATENT DOCUMENTS 9,721,166 B2   8/2017   Deri et al.
2010/0266159 A1*  10/2010  Ueki ................. G06K 9/00295
                                                            382/103

(Continued)

FOREIGN PATENT DOCUMENTS

CN    105117692 A    12/2015
CN    106682612 A    5/2017
(Continued)

OTHER PUBLICATIONS

Haolin, G., et al., "Specific Person Detection Method in Video Stream", Journal of Data Acquisition and processing, vol. 28, No. 3, China Academic Journal Electronic Publishing House, May 2013, pp. 307-312 (See English Abstract).

(Continued)

*Primary Examiner* — Kenny A Cese
(74) *Attorney, Agent, or Firm* — Xsensus LLP

(57) ABSTRACT

Embodiments of this disclosure provide a person searching method and apparatus and an image processing device. The method includes: performing person detection on a reference image, determining a query person, and acquiring property information on the query person; performing person detection on at least one video surveillance image, determining all candidate persons, and acquiring property information on all the candidate persons; calculating a match score of each candidate person according to the property information on the query person and property information on each candidate person, and selecting a predetermined number of candidate persons in a descending order of the match scores; and calculating similarities between the query person and the selected candidate persons, and taking a candidate person in the selected candidate persons having a highest similarity with the query person as the query person. In the embodiments of this disclosure, the query person is found from the video surveillance image by person detection and two-step retrieval.

8 Claims, 3 Drawing Sheets

(51) Int. Cl.
*G06K 9/62* (2006.01)
*G06T 3/00* (2006.01)

(58) Field of Classification Search
CPC .............. G06K 9/00771; G06K 9/6215; G06F 16/784; G06T 2207/30196; G06T 7/74; G06T 3/0018
See application file for complete search history.

(56) References Cited

U.S. PATENT DOCUMENTS

| | | | | |
|---|---|---|---|---|
| 2013/0250042 | A1* | 9/2013 | Raghoebardayal | H04N 13/207 348/36 |
| 2013/0343642 | A1* | 12/2013 | Kuo | G06K 9/4652 382/159 |
| 2017/0017833 | A1* | 1/2017 | Watanabe | G06K 9/00288 |
| 2020/0026949 | A1* | 1/2020 | Alcock | G06K 9/3233 |

FOREIGN PATENT DOCUMENTS

| | | |
|---|---|---|
| CN | 106682650 A | 5/2017 |
| CN | 107516127 A | 12/2017 |
| CN | 2018-25966 A | 2/2018 |

OTHER PUBLICATIONS

Guodong Zhang et al: "Reidentification of Persons Using Clothing Features in Real-Life Video", Applied Computational Intelligence and Soft Computing, vol. 2017, Jan. 11, 2017 (Jan. 11, 2017), pp. 1-9, XP055676858.
Alina Bialkowski et al: "A Database for Person Re-Identification in Multi-Camera Surveillance Networks", Digital Image Computing Techniques and Applications (DICTA), 2012 International Conference on, IEEE, Dec. 3, 2012 (Dec. 3, 2012), pp. 1-8, XP03231 0804.
Li Annan et al: "Clothing Attributes Assisted Person Reidentification", IEEE Transactions on Circuits and Systems for Video Technology. Institute of Electrical and Electronics Engineers, US, vol. 25, No. 5, May 1, 2015 (May 1, 2015), pp. 869-878, XP011580033.
Antitza Dantcheva et al: "Bag of soft biometrics for person identification; New trends and challenges", Multimedia Tools and Applications, Kluwer Academic Publishers, BO, vol. 51, No. 2, Oct. 27, 2010 (Oct. 27, 2010), pp. 739-777, XP019875407.
Extended European Search Report issued by the European Patent Office for corresponding European Patent Application No. 19203216.7 dated Mar. 25, 2020.

* cited by examiner

Query

PERSON SEARCHING METHOD AND APPARATUS AND IMAGE PROCESSING DEVICE

CROSS-REFERENCE TO RELATED APPLICATION

The present application claims priority to CN 201811275884.6, filed Oct. 30, 2018, the entire contents of which are incorporated herein by reference.

FIELD

This disclosure relates to the field of image processing, and in particular to a person searching method and apparatus and an image processing device.

BACKGROUND

Person searching is searching a given person (query) among a plurality of cameras and giving out the location and their corresponding camera IDs.

Person searching has many applications, such as finding a lost child, searching criminals, cross-camera person tracking, and person activity analysis. There are many challenges such as complex variations of human poses, camera viewpoints, lighting, occlusion, resolution, and background clutter.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that although there are numerous person re-identification methods for person retrieval, they just focus on retrieving with cropped person images between query and candidates. So these methods are not fit for searching the query person in the whole image.

In order to solve at least one of the above problems, embodiments of this disclosure provide a person searching method and apparatus and an image processing device, so as to find a query person in a video surveillance image.

According to a first aspect of the embodiments of this disclosure, there is provided a person searching method, wherein the method includes:

performing person detection on a reference image, determining a query person, and acquiring property information on the query person;

performing person detection on at least one video surveillance image, determining all candidate persons, and acquiring property information on all the candidate persons;

calculating a match score of each candidate person according to the property information on the query person and property information on each candidate person, and selecting a predetermined number of candidate persons in a descending order of the match scores; and calculating similarities between the query person and the selected candidate persons, and taking a candidate person in the selected candidate persons having a highest similarity with the query person as the query person.

According to a second aspect of the embodiments of this disclosure, there is provided a person searching apparatus, characterized in that the apparatus includes:

a first detecting unit configured to perform person detection on a reference image, determine a query person, and acquire property information on the query person;

a second detecting unit configured to perform person detection on at least one video surveillance image, determine all candidate persons, and acquire property information on all the candidate persons;

a selecting unit configured to calculate a match score of each candidate person according to the property information on the query person and property information on each candidate person, and select a predetermined number of candidate persons in a descending order of the match scores; and a determining unit configured to calculate similarities between the query person and the selected candidate persons, and take a candidate person in the selected candidate persons having a highest similarity with the query person as the query person.

According to a third aspect of the embodiments of this disclosure, there is provided an image processing device, wherein the image processing device includes the person searching apparatus as described in the second aspect.

According to a fourth aspect of the embodiments of this disclosure, there is provided a computer readable program, which, when executed in a person searching apparatus or an image processing device, may cause the person searching apparatus or the image processing device to carry out the person searching method as described in Embodiment 1.

According to a fifth aspect of the embodiments of this disclosure, there is provided a computer storage medium, including a computer readable program, which may cause a person searching apparatus or an image processing device to carry out the person searching method as described in Embodiment 1.

An advantage of the embodiments of this disclosure exists in that the query person is found from the video surveillance image by person detection and two-step retrieval.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Various implementations of the embodiments of this disclosure shall be described below with reference to the accompanying drawings. These implementations are illustrative only, and are not intended to limit this disclosure.

Embodiment 1

Figure 1:
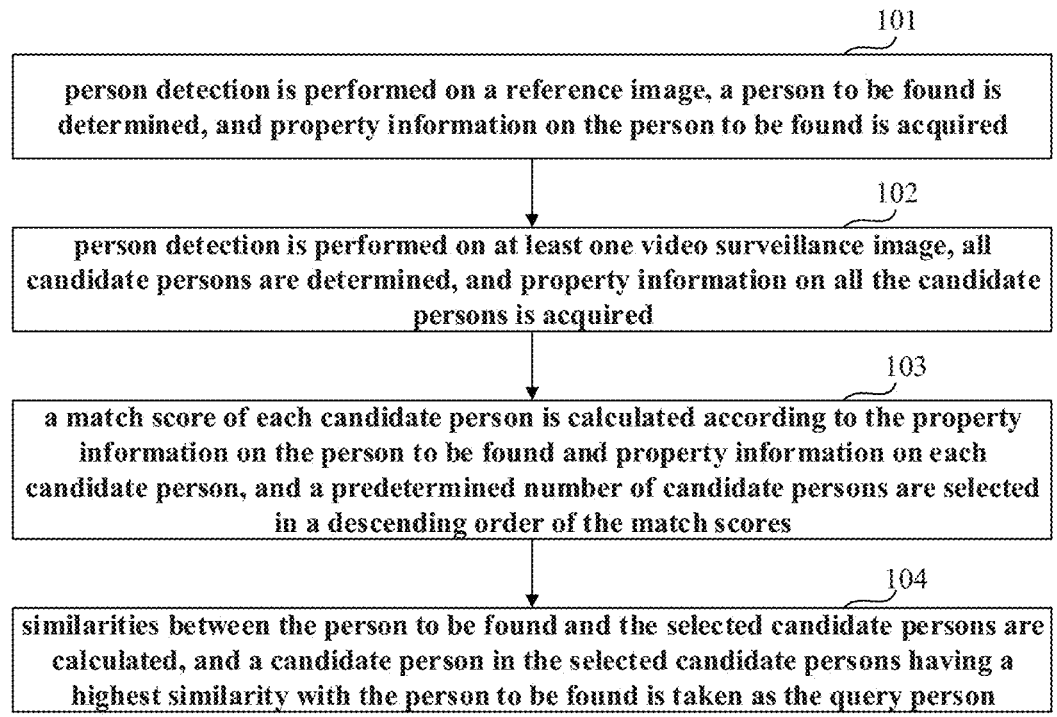
FIG. 1 is a schematic diagram of an implementation of the person searching method of Embodiment 1.

This embodiment provides a person searching method. FIG. 1 is a schematic diagram of an implementation of the person searching method of Embodiment 1. Referring to FIG. 1, the method includes:

step 101: person detection is performed on a reference image, a person to be found is determined, and property information on the person to be found is acquired;

step 102: person detection is performed on at least one video surveillance image, all candidate persons are determined, and property information on all the candidate persons is acquired;

step 103: a match score of each candidate person is calculated according to the property information on the person to be found and property information on each candidate person, and a predetermined number of candidate persons are selected in a descending order of the match scores; and step 104: similarities between the person to be found and the selected candidate persons are calculated, and a candidate person in the selected candidate persons having a highest similarity with the person to be found is taken as the query person.

In this embodiment, the candidate persons are found from the video surveillance image by the person detection, and a certain number of candidate persons are selected according to the property information of the person to be found and the candidate persons (first-step retrieval), and finally the person to be found is found from the candidate persons according to high-dimensional features of the person to be found and the selected candidate persons (second-step retrieval). Thus, the person to be found is found from the video surveillance image only by the person detection and the two-step retrieval, which improves the accuracy of the person searching and lowers calculation complexity.

In step 101 of this embodiment, the above-described reference image may be a pre-captured photo, and the person to be found is detected from the pre-captured photo, which is suitable for searching for missing persons, suspects, and the like. However, this embodiment is not limited thereto, and the reference image may also be a video surveillance image, and the person to be found is detected from the video surveillance image, which is suitable for cross-camera person tracking and person activity analysis. The person to be found in this embodiment may also be referred to as a query person.

In step 102 of this embodiment, the video surveillance image may be an image captured by a camera disposed at an arbitrary position, such as an image captured by a camera disposed in a hotel corridor, an office area, a roadside, a shopping mall, or the like. Moreover, the video surveillance image may be a two-dimensional planar image, or may be a fisheye video image that is relatively commonly used at present.

If the video surveillance image is a two-dimensional planar image, in step 102, person detection may be directly performed on the image to determine all candidate persons (candidates); and if the video surveillance image is a fisheye video image, before step 102, de-fishing operations may further be performed on the fisheye video image to obtain a video surveillance image with fisheye being de-fished, so that person detection is performed on the video surveillance image with fisheye being de-fished in step 102.

Figure 2:
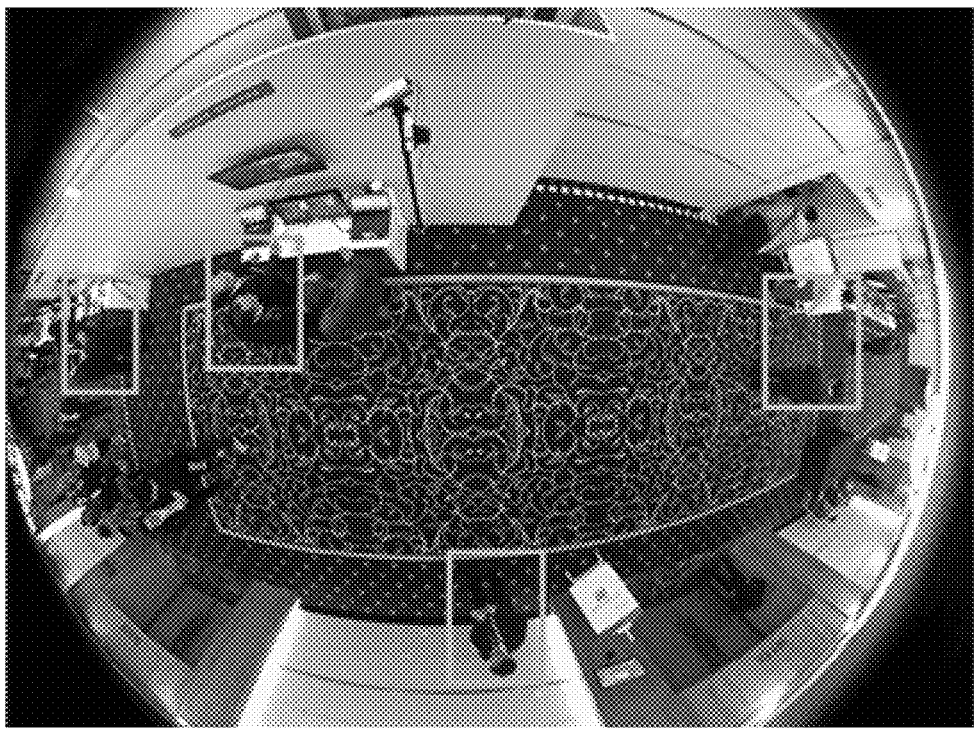
FIG. 2 is a schematic diagram of a fisheye video image.

FIG. 2 is a schematic diagram of the fisheye video image. As shown in FIG. 2, only four persons are detected by performing person detection on the fisheye video image, which are shown by frames. Due to characteristics of the fisheye video image, most of persons in the obtained fisheye video image cannot be successfully detected, and moreover, directions of some persons are opposite. In order to obtain all the persons in the image, de-fishing operations may be performed on the fisheye video image.

Figure 3:
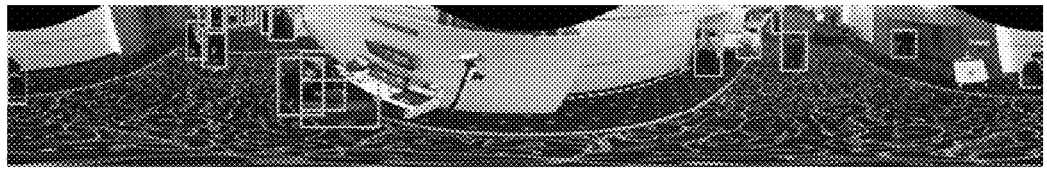
FIG. 3 is a schematic diagram of the fisheye video image in FIG. 2 after being de-fished.

FIG. 3 is a schematic diagram of the fisheye video image in FIG. 2 after being de-fished. As shown in FIG. 3, after the fisheye video image shown in FIG. 2 is performed de-fishing operations, person detection is performed on the de-fished image, and the result in FIG. 3 may be obtained. As can be seen from FIG. 3, more than twenty persons are found, which are shown by frames, and all of them are upright.

A manner of the de-fishing operations is not limited in this embodiment, and any existing processing manner may be applied to this application, which shall not be described herein any further.

A method of the person detection is also not limited in this embodiment. For example, a feature pyramid network (FPN) method for target detection may be used for the person detection, or other methods, such as a single shot detector (SSD, YOLO), or the like, may be used, which shall not be described herein any further.

In steps 101 and 102 of this embodiment, after the person to be found and all the candidate persons in the image are obtained by the person detection, the property information on the person to be found and the property information on all the candidate persons may be extracted from the image.

In this embodiment, the property information is information capable of embodying properties of persons, such as a clothes type, a clothes color, a hair type, a hair color, a height, and a shape. For the convenience of comparison, upper garment type, under garment type, upper garment color and under garment color, are taken as four types of property information on persons in this embodiment. The upper garment type and under garment type may be broadly divided into following nine types: up_Jacket, up_Longshirts, up_Shortshirts, up_Suit, up_Coat, low_Pants, low_Skirts, and low_Shorts. And the upper garment color and under garment color may be broadly divided into following ten types: black, blue, green, red, gray, white, yellow, purple, pink, and unknown. The classification of the above property information and indices included in each type of property information are examples only, and in particular implementations, according to requirements on detection precision, classification of the property information or indices of each property may be increased, or classification of the property information or indices of each property may be decreased, which are not limited in this embodiment.

In this embodiment, after the person to be found and the candidate persons in the image are obtained, the property information on the person may be extracted from the image according to the classification of the above properties. For example, the person in the image may be divided into an upper half and a lower half, and then it is classified by using a convolutional neural network (CNN) model to obtain the above property information on the person.

Figure 4:
FIG. 4 is a schematic diagram of a person to be found (a query person)

FIG. 4 is a schematic diagram of a query person (query). As shown in FIG. 4, when a person in a frame in the image is taken as the query person, the property information on the person extracted from the image may be up_Longshirts, low_Pants, Up_white and low_black.

A manner in which the property information on the person is obtained from the image is not limited in this embodiment. For example, it may be obtained by using the above-described CNN model, or may be obtained in other manners.

In step 103 of this embodiment, a probability of the property information on each candidate person may be extracted according to the property information on the person to be found, and then a product of the probability of the property information and a weight to which the property information corresponds is taken as a match score of the candidate person.

In this embodiment, each index for each property of each candidate person has a probability. Hence, according to the property information on the person to be found, a probability of an index corresponding to the property information may be extracted from the probability of each candidate person, and a product of the probability and a weight corresponding to the index is taken as a match score of the candidate person.

Still taking FIG. 4 as an example, the property information on the person to be found is up_Longshirts, low_Pants, up_white, and low_black. According to the property information, for each property, such as up_Longshirts, a probability that "an upper garment type of the candidate person is of a long shirt" may be extracted, and a product of the probability and a weight to which "an upper garment type is of a long shirt" corresponds is taken as a match score of the property. The other three properties are similarly processed, thereby obtaining the match scores of the candidate persons. For example, the match score may be obtained through calculation by using the formula as below:

$$Score=\Sigma p_i * w_i, i=1,\ldots,n;$$

where, $p_i$ is a probability of an i-th property of the candidate person, $w_i$ is a weight of the i-th property, i is a sequence number of a property in the property information, and n is a total number of the properties, which is 4 in this example, that is, there are four properties.

The above formula is illustrative only, other methods may also be used to obtain the match score of each candidate person, and the higher the match score of the candidate person is, the more likely it is the person to be found. Hence, in this embodiment, the predetermined number of candidate persons is selected in a descending order of the match scores to perform further retrieval. Here, the number of the selected candidate persons is not limited, which may be determined as needed.

Figure 5:
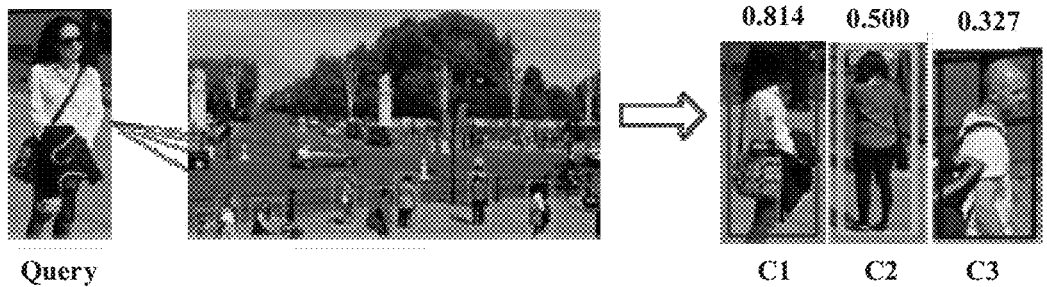
FIG. 5 is a schematic diagram of three candidate persons determined by calculating match scores of candidate persons according to property information on the query person in FIG. 4.

Still taking FIG. 4 as an example, by taking the detected person in FIG. 4 as a person to be found, all candidates are screened according to her property information, and three candidate persons having highest match scores are obtained, as shown in FIG. 5, which are denoted by C1, C2 and C3, respectively, with their match scores being 0.814, 0.5 and 0.327, respectively.

In step 104 of this embodiment, by calculating similarities between the person to be found and the selected candidate persons with high probabilities, the person to be found is found from these candidate persons.

In one implementation, high-dimensional features of the person to be found and all the selected candidate persons may be acquired, and a similarity between the person to be found and each selected candidate person is calculated according to the high-dimensional features of the person to be found and each selected candidate person.

In this implementation, the high-dimensional features may be fully-connected features of the CaffeNet model. By calculating a cosine similarity between the person to be found and each selected candidate person, a plurality of similarities may be ordered, and a result of highest similarity is outputted and taken as a final result, that is, taken as the person to be found.

For example, the similarity may be obtained through calculation by using the formula as below:

$$\text{Similarity}_i = \frac{Q \cdot C_i^T}{|Q||C_i^T|}, i = 1, \ldots, m;$$

$$j = \text{argmax}(\text{Sim});$$

where, i is a sequence number of a selected candidate person, Q is the high-dimensional feature of the person to be found, Ci is the high-dimensional features of the selected candidate person, m is the total number of the selected candidate persons, and j is the index of a candidate person having a highest similarity.

The above formula is illustrative only, other methods may also be used to calculate the similarities between the person to be found and the candidate persons, and the higher a similarity is, the more likely a candidate person is the person to be found. Hence, the candidate person having the highest similarity is taken as a result and outputted in this embodiment.

Figure 6:
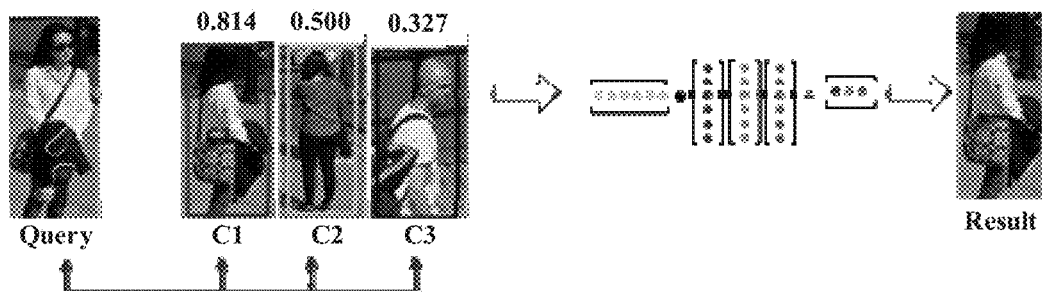
FIG. 6 is a schematic diagram of a query person determined by calculating similarities between the query person and the candidate persons.

The query person (query) shown in FIG. 4 and the candidate persons C1, C2 and C3 shown in FIG. 5 are still taken as an example. In this example, there are three candidate persons, that is, m is 3. In this embodiment, the high-dimensional features of the query person and these three candidate persons are extracted, the similarity between the query person and each candidate person is calculated, and the candidate person having the highest similarity is taken as a result and outputted. As shown in FIG. 6, in this example, j=C1.

With this embodiment, the query person is found from the video surveillance image by person detection and two-step retrieval.

Embodiment 2

This embodiment provides a person searching apparatus. As principles of the apparatus for solving problems are similar to that of the method of Embodiment 1, reference may be made to implementation of the method of Embodiment 1 for particular implementation of this apparatus, with identical contents being not going to be described herein any further.

Figure 7:
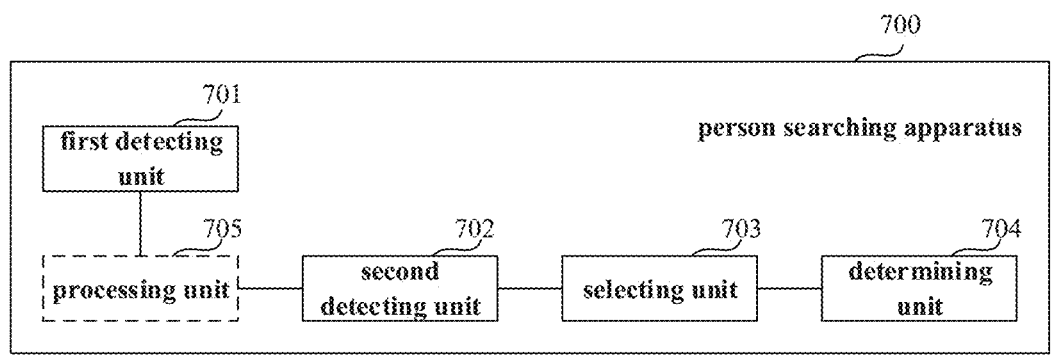
FIG. 7 is a schematic diagram of an implementation of the person searching apparatus of Embodiment 2.

FIG. 7 is a schematic diagram of an implementation of a person searching apparatus 700 of this embodiment. As shown in FIG. 7, the person searching apparatus 700 includes a first detecting unit 701, a second detecting unit 702, a selecting unit 703 and a determining unit 704. The first detecting unit 701 is configured to perform person detection on a reference image, determine a query person, and acquire property information on the query person; the second detecting unit 702 is configured to perform person detection on at least one video surveillance image, determine all candidate persons, and acquire property information on all the candidate persons; the selecting unit 703 is configured to calculate a match score of each candidate person according to the property information on the query person and property information on the candidate persons, and select a predetermined number of candidate persons in a descending order of the match scores; and the determining unit 704 is configured to calculate similarities between the query person and the selected candidate persons, and take a candidate person in the selected candidate persons having a highest similarity with the query person as the query person.

In this embodiment, the reference image may be a pre-captured photo or video surveillance image; however, this embodiment is not limited thereto.

In this embodiment, the video surveillance image may be a fish-eye video image, and as shown in FIG. 7, the apparatus 700 may further include:

a processing unit 705 configured to de-fish the video surveillance image to obtain a de-fished video surveillance image, so that the second detecting unit performs the person detection on the de-fished video surveillance image.

In this embodiment, the property information may include an up-cloth type, a low-cloth type, an up-cloth color, and a low-cloth color.

In one implementation of this embodiment, the selecting unit 703 may extract a probability of the property information on each candidate person according to the property information on the query person, and take a product of the probability of the property information and a weight to which the property information corresponds as the match score of the candidate person.

For example, the selecting unit 703 may calculate the match score of each candidate person by using a formula as below:

$$\text{Score} = \Sigma p_i * w_i, i = 1, \ldots, n$$

where, $p_i$ is a probability of an i-th property of the candidate person, $w_i$ is a weight of the i-th property, i is a sequence number of a property in the property information, and n is a total number of the properties.

In one implementation of this embodiment, the determining unit 704 may acquire high-dimensional features of the query person and all the selected candidate persons, and calculate a similarity between the query person and each selected candidate person according to the high-dimensional features of the query person and each selected candidate person.

For example, the determining unit 704 may calculate the similarity by using a formula as below:

$$\text{Similarity}_i = \frac{Q \cdot C_i^T}{|Q||C_i^T|}, i = 1, \ldots, n;$$

where, i is a sequence number of a selected candidate person, Q is the high-dimensional feature of the query person, Ci is the high-dimensional feature of the selected candidate person, and m is a total number of the selected candidate persons.

With this embodiment, the query person is found from the video surveillance image by person detection and two-step retrieval.

Embodiment 3

This embodiment provides an image processing device, including the person searching apparatus as described in Embodiment 2.

Figure 8:
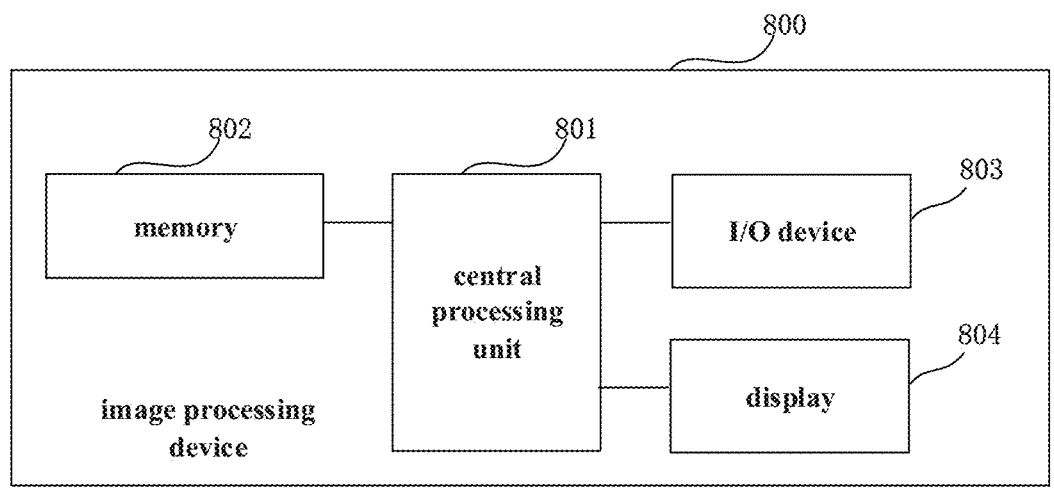
FIG. 8 is a schematic diagram of the image processing device of Embodiment 3.

FIG. 8 is a schematic diagram of the image processing device of the embodiment of this disclosure. As shown in FIG. 8, an image processing device 800 may include a central processing unit (CPU) 801 and a memory 802, the memory 802 being coupled to the central processing unit 801. The memory 802 may store various data, and furthermore, it may store a program for information processing, and execute the program under control of the central processing unit 801.

In one implementation, the functions of the person searching apparatus 700 may be integrated into the central processing unit 801. The central processing unit 801 may be configured to carry out the person searching method described in Embodiment 1.

In another implementation, the person searching apparatus 700 and the central processing unit 801 may be configured separately. For example, the person searching apparatus 700 may be configured as a chip connected to the central processing unit 801, with the functions of the person searching apparatus 700 being carried out under control of the central processing unit 801.

In this embodiment, the central processing unit 801 may be configured to perform following control: performing person detection on a reference image, determining a query person, and acquiring property information on the query person; performing person detection on at least one video surveillance image, determining all candidate persons, and acquiring property information on all the candidate persons; calculating a match score of each candidate person according to the property information on the query person and property information on each candidate person, and selecting a predetermined number of candidate persons in a descending order of the match scores;

and calculating similarities between the query person and the selected candidate persons, and taking a candidate person in the selected candidate persons having a highest similarity with the query person as the query person.

Furthermore, as shown in FIG. 8, the image processing device 800 may include an input/output (I/O) device 803, and a display 804, etc. Functions of the above components are similar to those in the related art, and shall not be described herein any further. It should be noted that the image processing device 800 does not necessarily include all the parts shown in FIG. 8, and furthermore, the image processing device 800 may include parts not shown in FIG. 8, and the related art may be referred to.

An embodiment of the present disclosure provides a computer readable program, which, when executed in a person searching apparatus or an image processing device, may cause the person searching apparatus or the image processing device to carry out the method described in Embodiment 1.

An embodiment of the present disclosure provides a computer storage medium, including a computer readable program, which may cause a person searching apparatus or an image processing device to carry out the method described in Embodiment 1.

The above apparatuses and method of this disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations of the functional block diagrams (for example, the first detecting unit, the second detecting unit, the selecting unit, and the determining unit) shown in FIG. 7 may either correspond to software modules of procedures of a computer program, or correspond to hardware modules. Such software modules may respectively correspond to the steps shown in FIG. 1. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. A person searching apparatus, characterized in that the apparatus comprises:

a first detecting unit configured to perform person detection on a reference image, determine a query person, and acquire property information on the query person;

a second detecting unit configured to perform person detection on at least one video surveillance image, determine all candidate persons, and acquire property information on all the candidate persons;

a selecting unit configured to calculate a match score of each candidate person according to the property information on the query person and property information on each candidate person, and select a predetermined number of candidate persons in a descending order of the match scores; and a determining unit configured to calculate similarities between the query person and the selected candidate persons, and take a candidate person in the selected candidate persons having a highest similarity with the query person as the query person;

wherein the determining unit acquires high-dimensional features of the query person and all the selected candidate persons, and calculates a similarity between the query person and each selected candidate person according to the high-dimensional features of the query person and each selected candidate person; and wherein the determining unit calculates the similarity by using a formula as below:

$$\text{Similarity}_i = \frac{Q \cdot C_i^T}{|Q||C_i^T|}, i = 1, \ldots, n;$$

where, i is a sequence number of a selected candidate person, Q is the high-dimensional feature of the query person, Ci is the high-dimensional feature of the selected candidate person, and m is a total number of the selected candidate persons.

2. The apparatus according to claim 1, wherein the reference image is a pre-captured photo or a video surveillance image.

3. The apparatus according to claim 1, wherein the video surveillance image is a fish-eye video image, and the apparatus further comprises:
a processing unit configured to de-fish the video surveillance image to obtain a de-fished video surveillance image, so that the second detecting unit performs the person detection on the de-fished video surveillance image.

4. The apparatus according to claim 1, wherein the property information comprises an up-cloth type, a low-cloth type, an up-cloth color, and a low-cloth color.

5. The apparatus according to claim 1, wherein the selecting unit extracts a probability of the property information on each candidate person according to the property information on the query person, and takes a product of the probability of the property information and a weight to which the property information corresponds as the match score of the candidate person.

6. The apparatus according to claim 5, wherein the selecting unit calculates the match score of each candidate person by using a formula as below:

Score=$\Sigma p_i * w_i, i=1,\ldots,n;$ where, $p_i$ is a probability of an i-th property of the candidate person, $w_i$ is a weight of the i-th property, i is a sequence number of a property in the property information, and n is a total number of the properties.

7. An image processing device, characterized in that the image processing device comprises the person searching apparatus as claimed in claim 1.

8. A person searching method, characterized in that the method comprises:
performing person detection on a reference image, determining a query person, and acquiring property information on the query person;
performing person detection on at least one video surveillance image, determining all candidate persons, and acquiring property information on all the candidate persons;
calculating a match score of each candidate person according to the property information on the query person and property information on each candidate person, and selecting a predetermined number of candidate persons in a descending order of the match scores; and
calculating similarities between the query person and the selected candidate persons, and taking a candidate person in the selected candidate persons having a highest similarity with the query person as the query person;
wherein calculating similarities between the query person and the selected candidate persons comprises:
acquiring high-dimensional features of the query person and all the selected candidate persons, and calculating a similarity between the query person and each selected candidate person according to the high-dimensional features of the query person and each selected candidate person; and
wherein the similarity is calculated by using a formula as below:

$$\text{Similarity}_i = \frac{Q \cdot C_i^T}{|Q||C_i^T|}, i = 1, \ldots, n;$$

where, i is a sequence number of a selected candidate person, Q is the high-dimensional feature of the query person, Ci is the high-dimensional feature of the selected candidate person, and m is a total number of the selected candidate persons.

* * * * *